United States Patent [19]

Nambu

[11] Patent Number: 4,462,201
[45] Date of Patent: Jul. 31, 1984

[54] METHOD AND APPARATUS FOR DISCHARGING OBJECTS FROM HOLDERS

[76] Inventor: Tatsuo Nambu, c/o Nambu Electric Co., Ltd., 55, Kisshoin Ikenouchi-cho, Minami-ku, Kyoto, Japan

[21] Appl. No.: 206,952

[22] Filed: Nov. 14, 1980

[51] Int. Cl.³ ...................... B65B 23/02; B65B 23/08; B65B 5/10
[52] U.S. Cl. ........................................ 53/475; 53/246; 53/251; 53/248; 198/479
[58] Field of Search ................ 53/248, 251, 246, 443, 53/475, 244; 198/375, 377, 379, 479, 650, 653, 694, 695, 696

[56] References Cited
U.S. PATENT DOCUMENTS

| | | | |
|---|---|---|---|
| 2,112,119 | 3/1938 | Rowe | 198/479 X |
| 2,119,767 | 6/1938 | Anderson | 53/248 X |
| 2,133,248 | 10/1938 | Jones | 53/251 X |
| 2,760,536 | 8/1956 | Willsey | 198/479 X |
| 3,220,154 | 11/1965 | van der Schoot | 53/246 X |
| 3,224,610 | 12/1965 | Scollard et al. | 53/246 X |
| 3,342,012 | 9/1967 | Reading | 53/246 X |
| 3,847,070 | 11/1974 | Draggett | 198/479 X |
| 4,294,057 | 10/1981 | Winiasz et al. | 53/251 X |

Primary Examiner—Horace M. Culver
Attorney, Agent, or Firm—Fidelman, Wolffe & Waldron

[57] ABSTRACT

Method of discharging objects from holders transporting the objects at a first velocity from a first station where the holders successively take up the objects to a second station at which the objects are to be placed, wherein as the objects approach the second station, they are given a second velocity having a direction the angle of which relative to the first velocity gradually increases within a predetermined angular range thereby to decrease the first velocity, and when the first velocity has been substantially offset by the second velocity, the objects are successively discharged from the holders so as to be placed at the second station. A holder suitable for use in the method is also provided.

17 Claims, 19 Drawing Figures

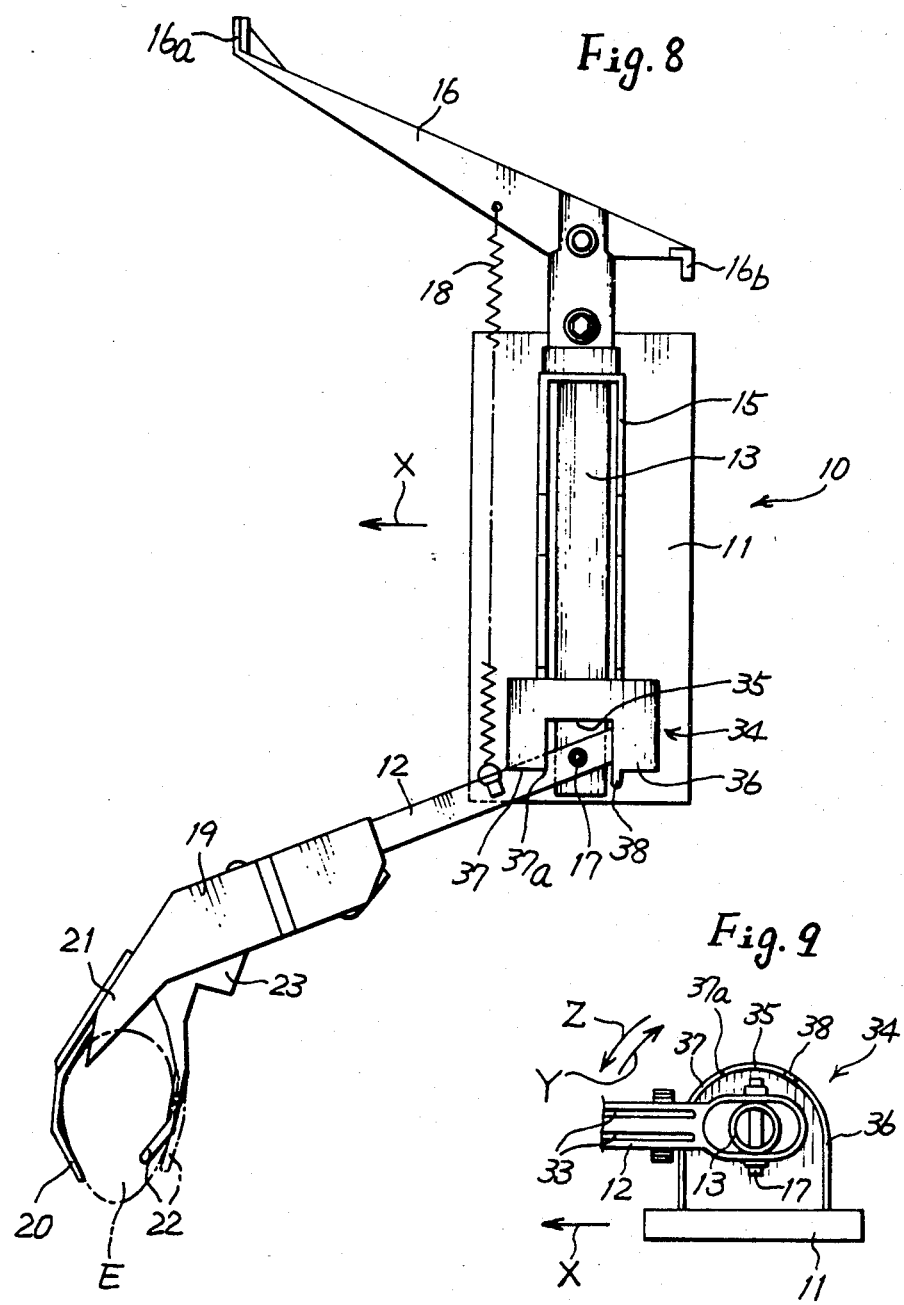

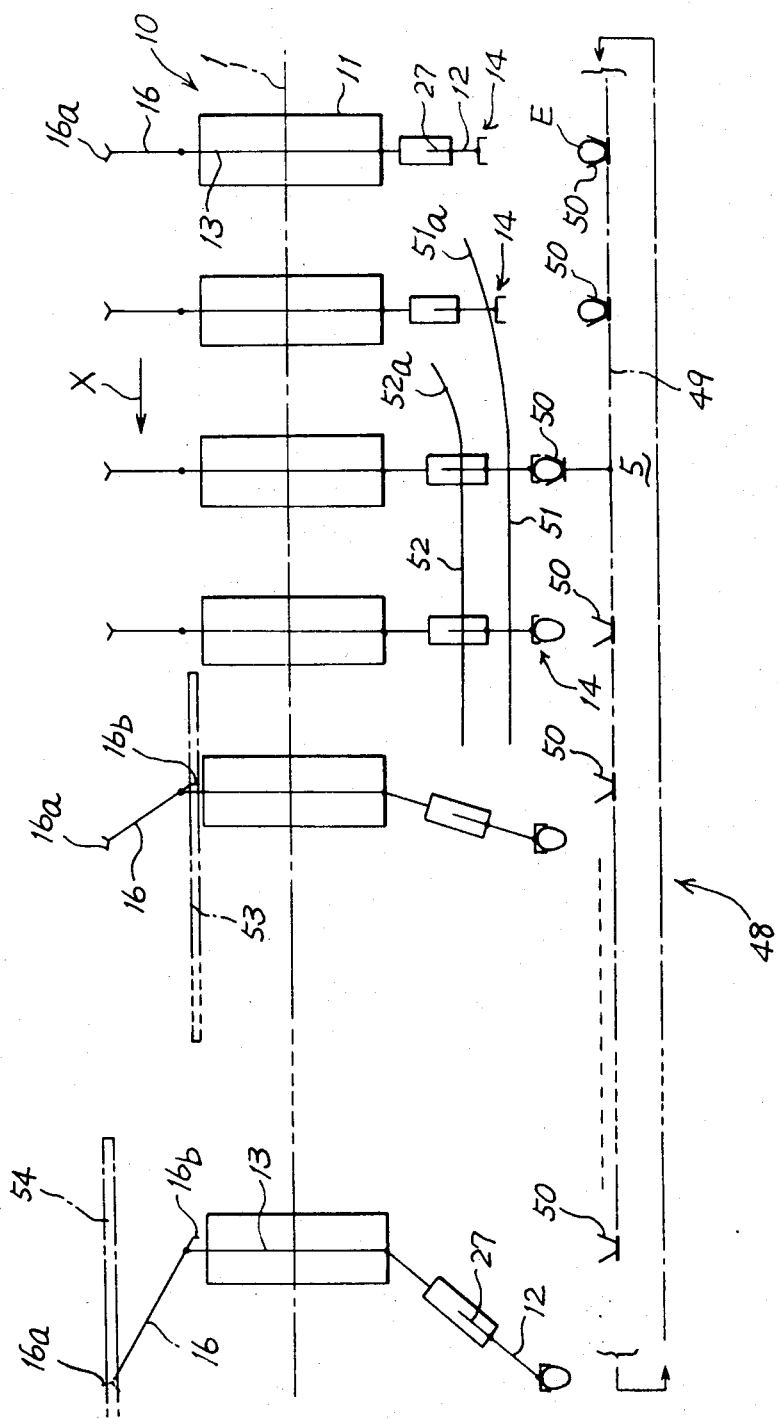

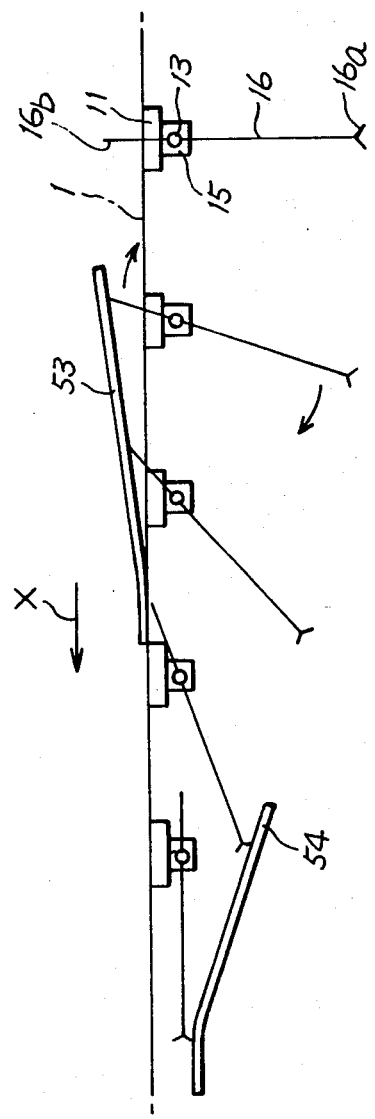

METHOD AND APPARATUS FOR DISCHARGING OBJECTS FROM HOLDERS

This invention relates to a method and apparatus for discharging objects from holders transporting the objects.

For marketing objects such as shell eggs, damageable fruits in retail stores it has been customary to separate them according to their size and/or quality and put them in containers for packaging. Various types of machines have been proposed for effecting such separation and packaging automatically.

One known machine is provided with a plurality of grippers or holders arranged on an endless belt or chain, so that as the chain is driven to run, one of the holders after another picks up an egg at a first station where eggs are supplied and transports the egg to a second station at a predetermined distance away from the first and discharges the egg from the holder into a carton or a container.

With this arrangement, however, if the holder is running when it releases the egg, the velocity of the holder in the direction of transport will cause a serious problem. This is particularly true with such objects as eggs and fruits which are likely to be broken or damaged.

One known type of egg carton made of plastic material comprises a tray or base portion having a plurality, say, ten cavities arranged in two rows in each of which five cavities are arranged closely side by side for receiving eggs therein and a cover hinged or otherwise movably attached to the base portion along one edge thereof.

The egg released in the manner previously mentioned from the holder which is running drops aslant in the running direction of the holder due to the horizontal component of the velocity of the holder. As a result, the egg dropping into one of the cavities of the tray portion of the plastic carton is likely to collide on the side with the egg previously received in the adjacent cavity so that the eggs are damaged or broken.

Accordingly, the primary object of the invention is to provide a method of successively discharging objects such as eggs, damageable fruits, etc. from the holders transporting the objects in a predetermined direction so that each of the objects are placed at predetermined positions accurately without collision of any objects at adjacent positions.

In accordance with the method of the invention, as an object is being transported by a holder in a predetermined direction, the object is accorded a velocity having a direction the angle of which relative to the direction of transport gradually increases within the range of 90° to 180°, thereby to gradually decrease the velocity of the object in the direction of transport substantially to zero or below a predetermined value, whereupon the object is released from the holder so as to be placed accurately at a predetermined location. In other words, when the object is released from the holder, it is given a velocity having the same or approximately the same magnitude but a direction opposite to the direction in which the object is being transported, so that the velocity of the object in the direction of transport is offset or reduced.

Another object of the invention is to provide an apparatus for carrying out the above-mentioned method.

Another object of the invention is to provide a device for holding an object which is suitable for use in carrying out the above-mentioned method.

The invention will be described in detail with reference to the accompanying drawings, wherein;

FIG. 8 is a front view of the holder shown in FIG. 7, with the gripper arm in the parallel and lowered position;

FIG. 9 is a bottom view of a portion of FIG. 8;

FIG. 18 is a view for explaining the gripping operation of the gripping arm; and FIG. 19 is a top plan view of the device for turning the driving arm from the perpendicular to the parallel position.

Figure 1:
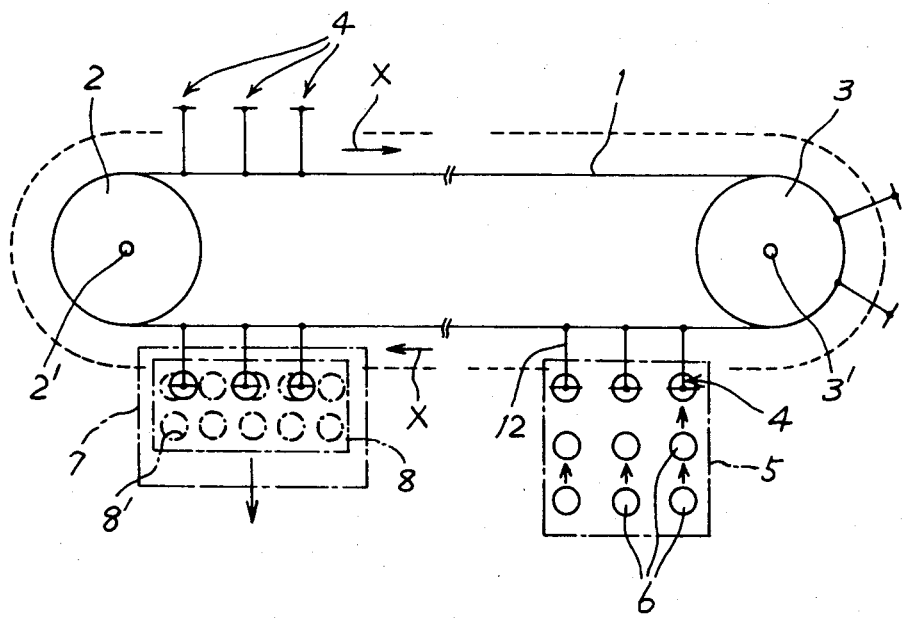
FIG. 1 is a top plan view schematically showing a prior art method of discharging eggs from holders transporting the eggs.
Figure 2:
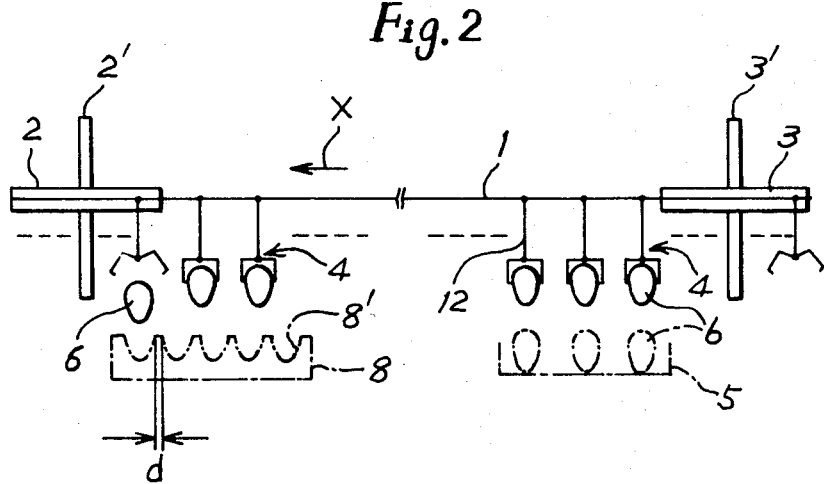
FIG. 2 is a front view of the system of FIG. 1.

Now referring to the drawings, first to FIGS. 1 and 2 which schematically illustrate a known method of transporting eggs from a first station where holders successively take up eggs to a second station where the holders successively release or discharge the eggs to drop into a container for packaging, there is schematically shown an endless chain 1 provided between a pair of sprocket wheels 2 and 3 fixed to rotatable shafts 2' and 3', respectively, one of which, say, the shaft 3' is connected to a suitable drive not shown.

A plurality of holders 4 are secured to the chain 1 with a predetermined distance from each other along the length of the chain. Eggs 6 are supplied from a source, such as an egg sorting machine to a first station 5 provided near the chain. In practice, eggs of different sizes are supplied to corresponding different positions in the first station. For simplicity of explanation it is assumed that eggs of the same size are supplied to the first station 5.

As the chain 1 is driven, the holders circulate and as they come to the first station they successively pick up the eggs supplied thereto and carry them horizontally in the direction of an arrox X or clockwise at a predetermined velocity V.

A tray or container 8 for packaging is placed at a second station 7 a predetermined distance downstream or leftward of the first station along the chain 1. The container 8 can be a conventional type of plastic and formed with a plurality, say, ten cavities 8' for receiving eggs therein.

The holders 4 that have transported the eggs to the second station successively release the eggs to drop into the cavities of the container 8. As previously mentioned, unless the horizontal movement of the holders 4 is stopped, the eggs released from the holders drop aslant in the direction of movement of the holders, with resulting great danger of a dropping egg colliding with the egg previously received in the adjacent cavity so that both eggs will be damaged or broken.

The damage may be avoided if there is provided a greater distance or gap d between adjacent two of the cavities 8'. However, such increase in the distance will result in an increase in the size of the container for accommodating the same number of eggs and consequently in the amount of material required to make a container and the space for accommodating the container for transportation and storage. Even if the increase is minute for a single container, it will amount to much for a large number of such containers that are put on the market daily. The cost involved therefore increases.

Alternatively, the collision of eggs may be avoided by temporarily stopping the holder thereby to eliminate the horizontal component of the movement when the holder releases the egg. To stop many holders one after another, however, will decrease the number of eggs that can be transported per unit period of time, with resulting increase in the cost of packaging.

Figure 3:
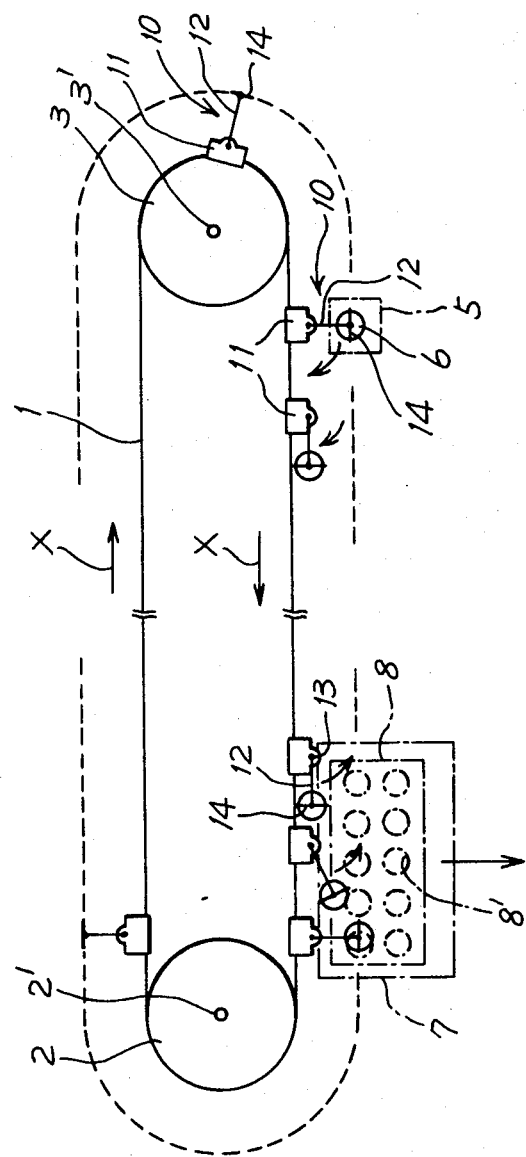
FIG. 3 is a top plan view schematically showing one embodiment of the invention.
Figure 4:
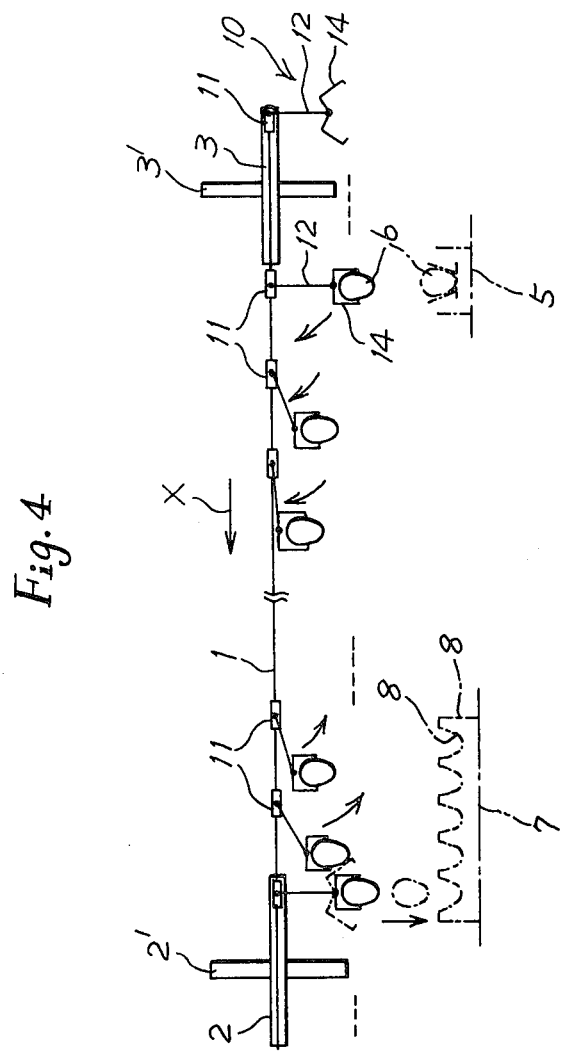
FIG. 4 is a front view schematically showing another embodiment of the invention.

Turning now to FIGS. 3 and 4 which illustrate two different methods in accordance with the invention, with the same reference symbols as in FIGS. 1 and 2 designating corresponding parts.

The method of the invention employs a particular holder generally designated by 10 and schematically shown in FIGS. 3 and 4 although a concrete structure of the holder 10 will be described later. The holder 10 has a block 11 by which it is fixed to an endless chain 1. The holder also has a gripper arm 12 fixed to a shaft 13 which is rotatably supported by the block 11. The angle of rotation of the shaft 13 and consequently the angular range of turning of the arm 12 about the axis of the shaft 13 is the angle, that is, 90° between a first position (which will be referred to as the parallel position of the arm) where the arm 12 is substantially parallel with the direction X in which the chain advances and where the gripper 14 provided at the outer end of the arm 12 is forwardly or leftward of the rotatable shaft 13 in the direction X and a second postion (which will be referred to as the perpendicular position of the arm 12) where the arm 12 lies substantially perpendicularly to the direction X.

As will be described in detail later, the gripper 14 is so designed as to pick up an egg at the first station (supply station) 5 and release the egg at the second station (packaging station) 7.

Suppose that the chain 1 is circulating clockwise in FIG. 3. The holder 10 on the chain arriving at the first station 5 has its gripper arm 12 in the perpendicular position relative to the direction X of movement of the running chain 1 and grips an egg by the gripper 14 at the station 5 as previously mentioned. As the holder 10 moves away from the first toward the second station, the arm 12 holding the egg is turned from the perpendicular to the parallel position. If the arrangement is such that the arm already is in its parallel position at the first station 5 when it grips an egg, it is not necessary to turn the arm to the parallel position.

As the holder 10 with its arm 12 in the parallel position approaches the second station 7, immediately before the station 7 the arm 12 begins to be turned on the shaft 13 toward the perpendicular position, whereupon the gripper 14 releases the egg. The arrangement is such that when the gripper releases the egg, the arm 12 has such an angular velocity that the velocity of the egg held by the arm relative to the mounting block 11 has a direction substantially opposite to that of movement of the chain and a magnitude as nearly equal to that of the velocity of the chain as possible.

Figure 5:
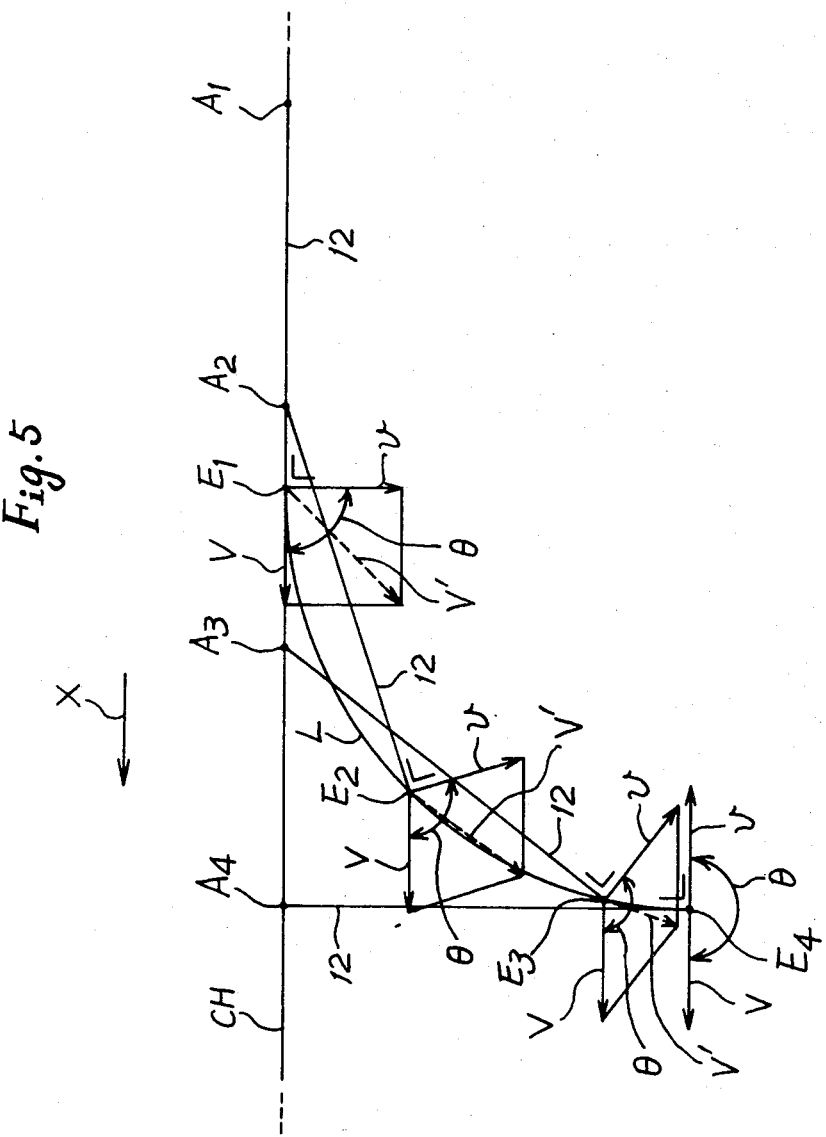
FIG. 5 is a view explaining the principle of the method of the invention.

For more detailed explanation, reference is also to be made to FIG. 5. As the gripper 14 with an egg gripped thereby is displaced from the parallel to the perpendicular position, in addition to the velocity V in the direction of X caused by the movement of the chain a velocity v in a negative direction relative to the direction X is accorded to the egg. As shown in FIG. 5, as the arm 12 is swung from the parallel to the perpendicular position, the direction of the velocity v or the angle $\theta$ gradually increases from 90° relative to the direction X to 180°, that is, the direction exactly opposite to the direction X of movement of the chain. When the angle $\theta$ becomes 180°, that is, the arm 12 is in the perpendicular position, the velocity v becomes equal to the velocity V, whereupon the egg has no velocity component in any directions and stands motionless relative to the machine frame or the ground despite the movement of the chain in the direction X. Therefore, if the gripper releases the egg at that time, it gravitates substantially vertically.

Theoretically, the gripper must release the egg when the arm 12 is exactly in the perpendicular position, but practically a predetermined angular range is allowed within which the gripper may release the egg. The same is true with the parallel position of the arm. Therefore, in the present specification and claims the terms "parallel position" and "perpendicular position" of the gripper arm 12 should be taken to include a predetermined angular range.

In FIG. 5, the locus traced by the egg held by the arm 12 as the arm 12 is swung from the parallel to the perpendicular position is designated by L, with the components of the velocity of the egg being shown by way of example at different positions E1 to E4 along the locus L. The rotatable shaft 13 of the arm 12 traces a linear locus CH as the holder 10 is moved, with different positions of the shaft 13 being shown by way of example at A1 to A4. When the shaft 13 is at the position A1, the egg held by the arm 12 is at the position E1, where the arm 12 starts to be turned counterclockwise about the shaft 13(A1) toward the perpendicular position. As the shaft 13 advances to the position A2, thence to A3 and A4, the egg is conveyed to E2, E3 and E4. When the shaft reaches the position A4 with the egg at the position E4, the arm 12 comes to take the perpendicular position. The resultant velocity of v and V is designated by V'.

As is apparent from FIG. 5, at the position E4 the components V and v have the same magnitude but are directed oppositely to each other, so that the egg stands motionless and is released from the gripper at that time. As previously mentioned, the position E4 is theoretical and practically the position at which the egg is released may be at both sides of the theoretical position E4 within a certain range.

With one of the cavities 8' of the container 8 situated at a point to which the egg falls within the station 7, the egg gravitates substantially vertically so that it will not collide with any egg already present in the adjacent one of the cavities of the container.

Practically the container having a plurality of egg-receiving cavities is placed at a predetermined position in the station 7, and successive discharge of eggs from the holders is so controlled as to prevent any egg from falling into the cavity which has already received an egg.

In FIG. 3, the egg is moved in a horizontal plane. The plane of the locus the egg is to trace need not necessarily be horizontal. The plane may also be vertical as shown in FIG. 4, which is a front elevational view not of FIG. 3 but of a different embodiment from FIG. 3.

In FIG. 4, when the gripper 14 of the arm 12 in the vertical position grips an egg at the first station 5, the arm 12 is turned clockwise or raised to a horizontal position in a vertical plane including the arm 12 so that the egg is situated forwardly in the direction X, and the arm is turned counterclockwise or lowered from the horizontal to the vertical position immediately before the second station 7 where the egg is to be released. The relation between the movement of the egg and the components of its velocity during the raising and lowering of the arm is substantially the same as in FIG. 3. In particular, when the arm has been lowered to the vertical position, the velocity V in the direction X is offset by the velocity v in the opposite direction so that the resultant velocity of the egg becomes zero. Therefore, if the egg is released when the arm is in the vertical position, it falls substantially vertically. In this case, too, the egg may be dropped within a certain angular range at both sides of the vertical position of the arm.

In FIG. 5, it is not necessary to make the velocity v equal to the velocity V at all points on the locus L. It is essential that only at the position E4 the velocity v is substantially equal in magnitude to and has a direction substantially opposite to that of the velocity V. The word "substantially" means that there is a certain allowable range.

Now turning to FIGS. 6 to 19 which show by way of example a holder 10 suitable for use in carrying out the method of the invention shown in FIG. 3.

The holder 10 has a mounting plate 11 fixed to an endless chain 1 so as to face outwardly of the chain, which is driven to circulate in a horizontal plane. A plurality of holders 10 are mounted on the chain so that each of them is spaced a predetermined distance along the chain from the adjacent holders.

The mounting plate 11 is provided with a bracket 15 fixed thereto and having a bearing for rotatably supporting a vertical shaft 13. A gripper arm 12 has its inner end connected to the lower end of the vertical shaft 13, and a driving arm 16 has its inner end fixed to the upper end of the shaft 13.

The inner end of the arm 12 is pivoted by a pin 17 perpendicularly crossing the axis of rotation of the shaft 13 to the lower end thereof so that the arm 12 can pivot up and down on the pin 17. Since the holder 10 is fixed to the chain with the axis of the rotatable shaft 13 extending vertically, the pivot pin 17 lies horizontally so that the arm 12 can pivot about the pin 17 between a lowered position in which the arm 12 has its outer end held down and an upper position in which the arm has it outer end held up. A pair of coil springs 18 somewhat schematically shown are provided between the gripper arm 12 and the driving arm 16 to bias the arm 12 upwardly to the above-mentioned upper or raised position.

The arm 12 is provided at the outer end thereof with a gripping device generally designated at 14 and comprising a palm member 19 mounted on the outer end of the arm 12 so as to be displaceable longitudinally thereof. The palm member 19 has a single relatively long central fixed finger 20 and a pair of relatively short lateral fixed fingers 21 at both sides of the central finger spaced a suitable distance therefrom.

The gripper 14 further comprises a movable member 23 formed integrally with a pair of movable fingers 22 facing the fixed fingers 20 and 21. The fingers 20 and 22 are so curved toward each other as to generally conform to the shape of the article (such as an egg E in the illustrated embodiment) to be gripped by the fingers.

Figure 7:
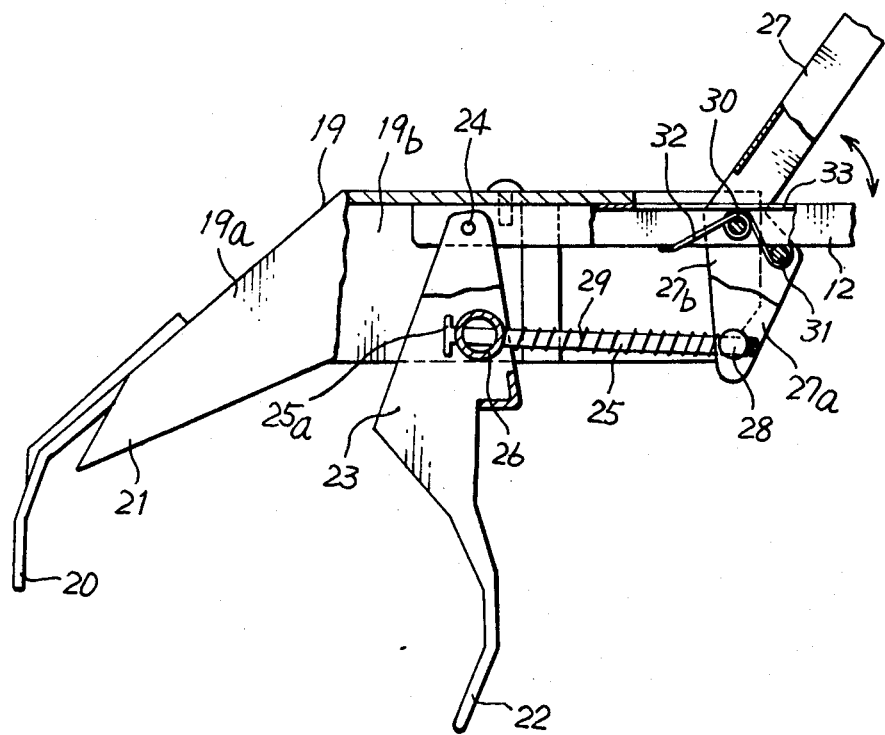
FIG. 7 is an enlarged side view, partly in vertical section, of a portion of FIG. 6 showing the gripper.

As shown in FIG. 7, the movable member 23 is disposed between the opposite side walls 19a and 19b of the palm member 19 and pivoted to the side walls by means of a horizontal pin 24. As the movable member 23 is pivoted about the pin 24 by an actuating mechanism to be described later, the movable fingers 22 can take a first (egg-gripping) position in which the movable fingers 22 approach the fixed fingers 20 and 21 to grip an egg therebetween and alternatively a second (egg-releasing) position in which the movable fingers 22 are moved away from the fixed fingers 20 and 21 to release the egg.

The actuating mechanism comprises a connecting rod 25 having one end loosely connected to a transverse sleeve-like member 26 fixed to the movable member 23 and the other end threaded to a transverse rod 28 fixed to the lower end of an actuating bar 27. A compression coil spring 29 somewhat schematically shown has an inner diameter a little greater than the outer diameter of the connecting rod 25 so that the coil spring 29 surrounds the rod 25 between the transverse members 26 and 28. The connecting rod 25 is formed with a head 25a at that end thereof which loosely passes the transverse member 26 so as to prevent disconnection of the end of the rod 25 from the member 26.

The actuating bar 27 is inverted U-shaped in transverse section and pivoted adjacent the lower end thereof to the arm 12 by a pin 30. The lower end portion of the actuating bar 27 is formed into an opposed pair of plates 27a and 27b, with the above-mentioned transverse rod 28 interposed between the two plates.

A stopper pin 31 is also provided between the pair of plate portions 27a and 27b above the transverse rod 28. The pivot pin 30 is provided with a spring 32, one end of which engages the lower edge of the arm 12 with the other end thereof engaging the stopper pin 31 so as to urge the actuating bar 27 counterclockwise in FIG. 7. The counterclockwise rotation of the actuating bar 27 is restricted by engagement of the stopper pin 31 with the lower edge of the arm 12.

Figure 10:
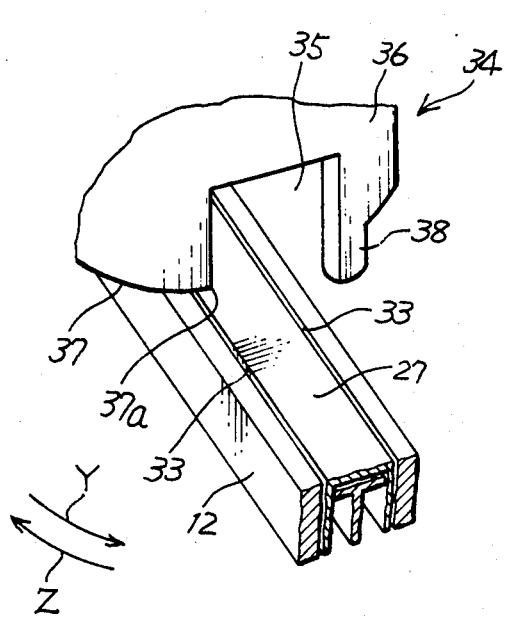
FIGS. 10, 11 and 12 are perspective views showing the operation of the gripper arm.
Figure 11:
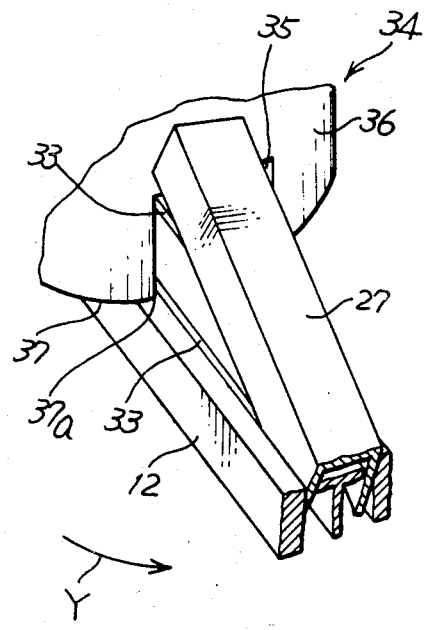
Figure 12:
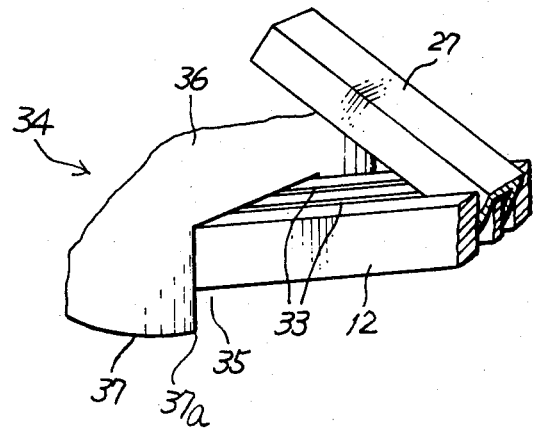

A pair of slots 33 are formed in the arm 12 along the length thereof as shown in FIGS. 10, 11, 12, etc., so that the opposite lateral walls of the inverted U-shaped member constituting the actuating bar 27 may slidably be inserted into the slots 33.

The bearing bracket 15 is provided at its lower end with a guide member 34 in the form of a horseshoe. The guide member 34 is so configured as to guide and control the operation of the gripper arm 12 and the actuating bar 27 as the arm 12 is turned from the parallel to the perpendicular position relative to the direction X of movement of the holder 10 as previously mentioned and will be described later.

The guide member 34 comprises a curved lateral wall 36 having a recess 35 formed in the lower edge at a position corresponding to the perpendicular position of the arm 12. That portion 37 of the lower edge of the wall 36 which extends at the forward side of the recess 35 in the direction X of movement of the holder serves as a guide edge for the arm 12 and the actuating bar 27 as they are turned from the parallel to the perpendicular position or vice versa as will be described later. A stopper 38 projects downwardly from the lower edge of the guide member 34 at the rear side of the recess 35 in the direction X of movement of the holder.

As shown in FIGS. 8 and 9 while the arm 12 gripping an egg E is in the parallel position, the upper surfaces of the arm 12 and the actuating bar 27 are held down by the lower edge 37 of the horseshoe member 34, with the actuating bar 27 having its lateral walls completely received in the slots 33 of the arm 12 so that the upper surfaces of the arm 12 and the bar 27 are in the same plane as most clearly shown in FIG. 10, and with the fingers 20, 21 and 22 gripping the egg E.

As the arm 12 is turned on the shaft 13 from the parallel to the perpendicular position clockwise in FIG. 9 and counterclockwise in FIGS. 10 and 11 as indicated by an arrow Y, the upper surfaces of the arm 12 and the actuating bar 27 slide in contact with the lower edge 37 of the horseshoe guide member 34. When the arm 12 has come a little before the perpendicular position as shown in FIG. 11, first the upper surface of the actuating bar 27 is released from the end 37a of the lower edge 37 to be positioned in the recess 35, so that the force of the spring 32 causes the actuating bar 27 to be turned counterclockwise about the pin 30 in FIG. 7 and through the connecting rod 25 the movable member 23 and consequently the movable fingers 22 to be turned counterclockwise about the pin 24, so that the movable fingers 22 move away from the fixed fingers 20 and 21 thereby to release the egg they have been gripping.

When the arm 12 is turned a little farther away from the above-mentioned position shown in FIG. 11 to reach the perpendicular position, the arm 12 is released from the end 37a of the restricting edge 37 of the horseshoe member 34 to be positioned in the recess 35, so that the arm is sprung upwardly to the raised position by the force of the springs 18 as shown in FIGS. 6, 12, 13 and 14.

The two-step operation that a little before the arm reaches the perpendicular position the movable fingers 22 are moved to release the egg and after a little time delay the arm 12 is sprung up assures safer release and gravitation of the egg than otherwise.

The illustrated arrangement that enables the two-step operation is preferable. The invention, however, is not limited to the arrangement but includes the one-step operation that the movable fingers 22 alone are moved and the arm 12 is not raised.

The swinging or turning of the arm 12 from the parallel to the perpendicular position is effected by means of the previously mentioned driving arm 16 fixed to the top end of the rotatable shaft 13. In particular, the holder 10 picks up an egg E at the supply station 5 and is conveyed by the chain 1 to the second station 7 (where the egg is to be discharged), with the arm gripping the egg being kept in the parallel position. Just before the discharge station 7 and above the arm 12 there is provided a device 40 for turning the driving arm 16.

Figure 15:
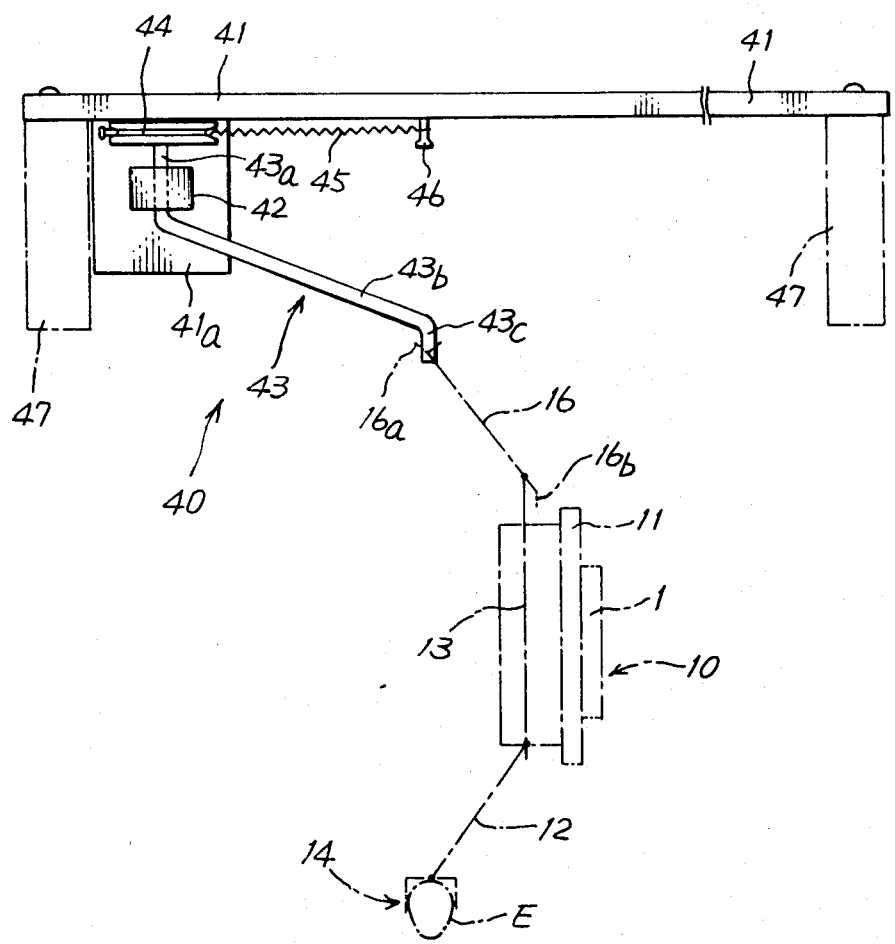
FIG. 15 is a side view of a device for turning the driving arm of the holder from the parallel to the perpendicular position.
Figure 16:
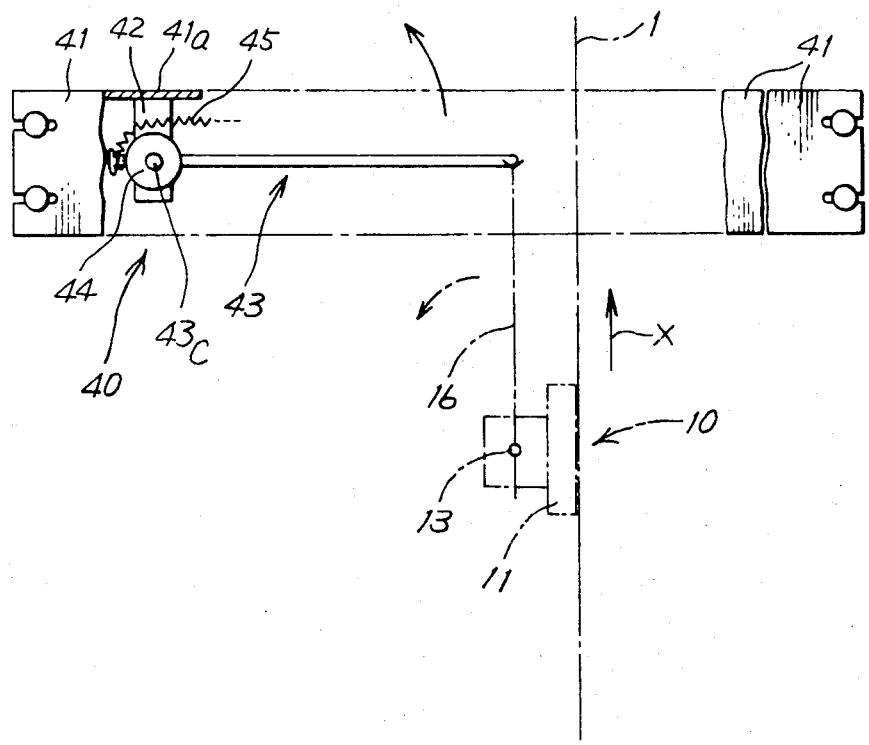
FIG. 16 is a top plan view, partly cut away, of the device shown in FIG. 15.

As shown in FIGS. 15 and 16, the device 40 comprises a support plate 41 having a depending tongue 41a to which a bearing 42 is fixed. The bearing 42 supports an actuating rod 43 which comprises a vertical portion 43a supported by the bearing 42, a main portion 43b extending from the vertical portion 43a downwardly aslant and a hook portion 43c formed at the lower end of the main portion for engagement with a corresponding recess 16a formed on the outer end of the driving arm 16 of the holder 10.

A pulley 44 is fixed to the upper end of the vertical portion 43a of the actuating rod 43 for simultaneous rotation with the vertical portion 43a about the axis thereof. A tension coil spring 45 somewhat schematically shown has its one end fixed to the pulley 44 and its opposite end fixed to the support plate 41 by a screw 46 threaded thereto. The support plate 41 is secured to the frame 47 of a conveyor not shown.

The operation of the device 40 will now be described with reference to FIG. 17 which is similar to FIG. 5. As the holder 10 is moved by the chain 1 in the direction X in FIG. 17, at the position A1 the recess 16a of the driving arm 16 in the parallel position is engaged by the hook portion 43c of the actuating rod 43 which then is in the perpendicular position relative to the direction X of movement of the chain. As the holder 10 farther advances to the position A2 and thence toward A3 and A4 while maintaining the engagement of the hook 43c with the recess 16c of the driving arm 16, the actuating rod 43 is turned counterclockwise in FIG. 17 about the axis of the vertical portion 43a causing the arm 16 to be turned counterclockwise about the shaft 13 with the recess 16a of the arm 16 (and the egg) tracing an arcuate locus L until the holder 10 reaches the position A4, whereupon the actuating rod 43 takes the parallel position while the driving arm 16 and consequently the gripper arm 12 take the perpendicular position so as to release the egg as previously mentioned.

As the holder 10 farther advances in the direction X, the driving arm 16 and the actuating rod 43 are disengaged from each other, whereupon the resiliency of the spring 45 urges the actuating rod 43 to return to the perpendicular position so as to be ready for engagement with the holder coming next.

Figure 17:
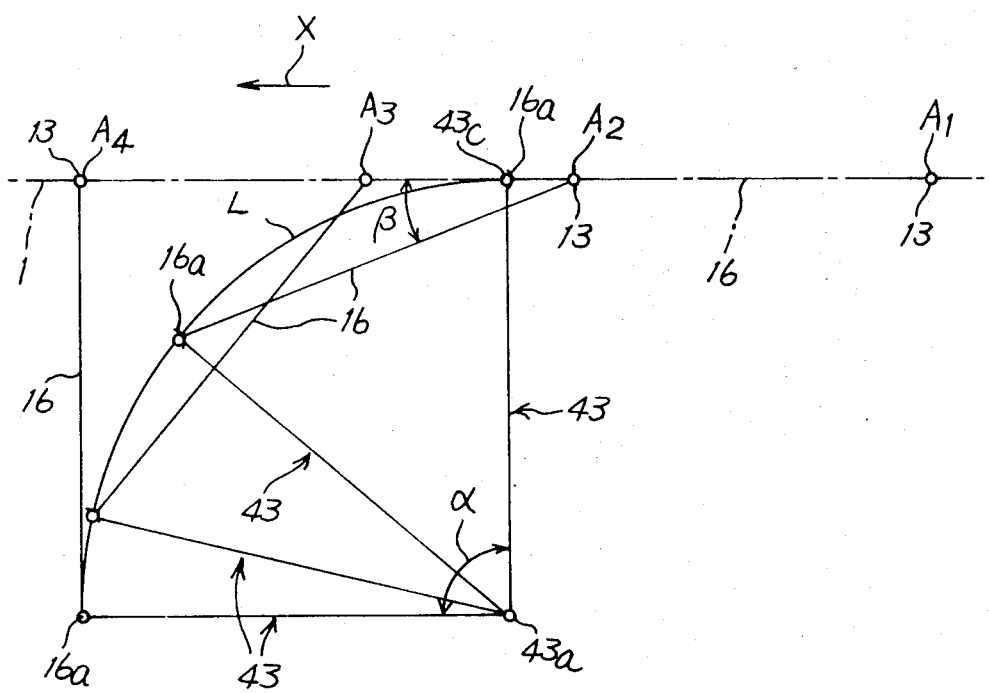
FIG. 17 is a view for explaining the operation of the device shown in FIGS. 15 and 16.

In FIG. 17 when the driving arm 16 and consequently the gripper arm 12 are in the parallel position relative to the chain 1 (that is, $\beta = 0°$) and at the same time the actuating rod 43 is in the perpendicular position (that is, $\beta = 90°$) relative to the chain 1, the arm 16 comes into engagement with the actuating rod 43. This is not essential, however, for the operation of the holder of the invention.

It is also possible to arrange so that the actuating rod 43 engages the driving arm 16 in a position making a certain angle $\beta > 0°$) with the direction X ($\alpha < 90°$).

Figure 13:
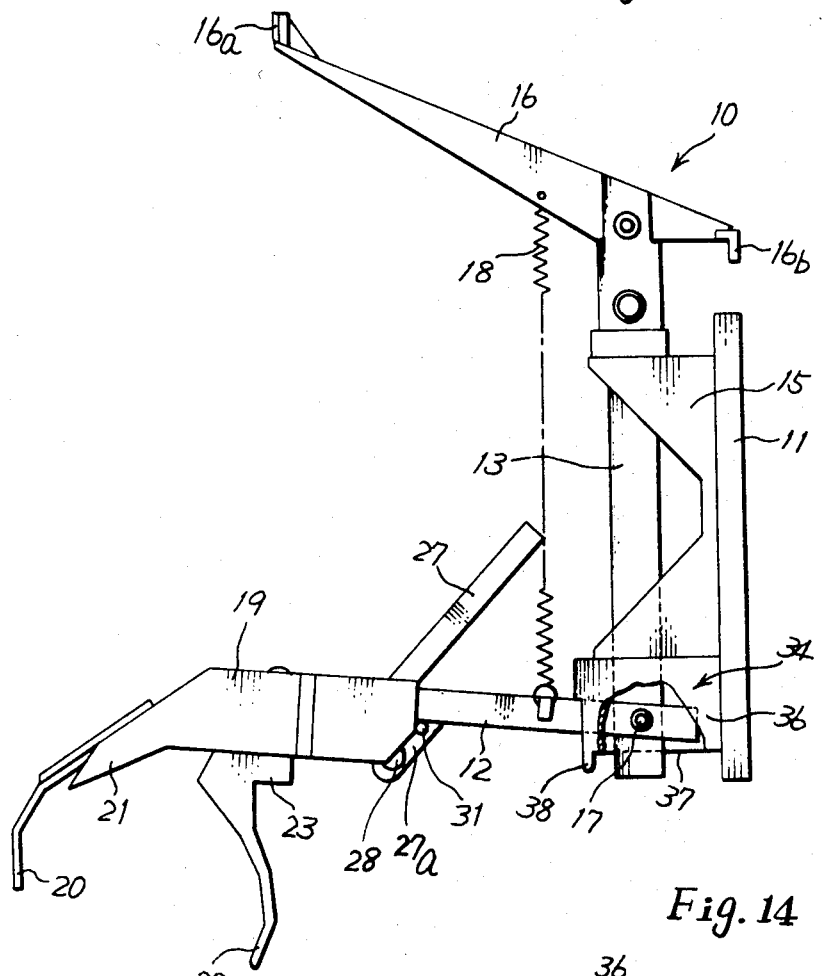
FIG. 13 is a side view of the holder shown in FIG. 7, with the gripper arm in the perpendicular and raised position.

As the chain 1 circulates, the holder 10 that has released the egg as shown in FIG. 13 is conveyed back to the station 5 where it is to grip an egg again. The operation of the holder to grip an egg will now be described with reference to FIG. 18. An apparatus 48 for supplying eggs to the station 5 comprises a plurality of baskets 50 for supporting therein an egg E to be gripped by the holder. The baskets 50 are mounted on an endless chain 49 and spaced a predetermined distance apart from each other.

A first rail 51 for holding down the arm 12 is provided outside the chain 1 and extends a predetermined distance from the upstream or right side in FIG. 18 of the station 5 in the direction X of movement of the chain 1 to the downstream or left side thereof. At the upstream side of the station 5 the starting end portion 51a of the rail 51 is disposed at such a height that the portion 51a may engage the upper surface of the arm 12 or actually the palm member 19 attached to the arm 12. From the staring end portion 51a the rail 51 extends downwardly aslant forwardly in the direction X of movement of the chain 1 and thence horizontally before it reaches the egg-gripping station 5.

Figure 6:
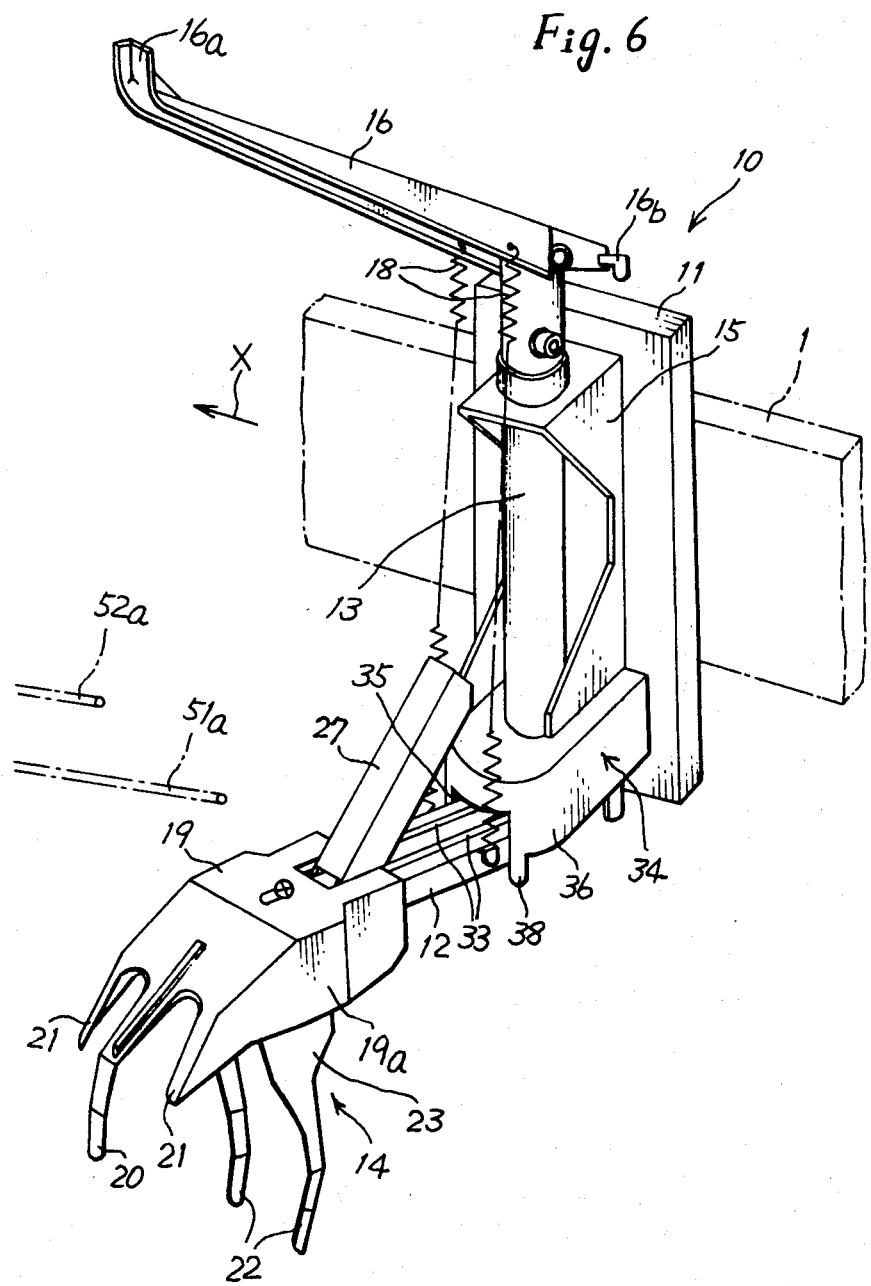
FIG. 6 is a perspective view of one embodiment of the holder of the invention.

With the arrangement of the rail 51, as a holder 10 carried on the circulating chain 1 comes around with the arm 12 being kept in the perpendicular and raised position as shown in FIGS. 6 and 13, the upper surface of the palm member 19 of the arm 12 is engaged by the first rail 51 before the station 5, and as the holder advances leftward in FIG. 18, the slope 51a of the rail 51 causes the arm 12 to be lowered or pivoted about the pin 17 counterclockwise in FIG. 13 toward the lowered position at such a height that at the station 5 the gripper 14 at the outer end of the arm 12 can grip an egg E supported by the basket 50 of the egg supplying apparatus 48.

In the lowered position the arm 12 is held so that its upper surface is a little below the end 37a of the lower edge 37 of the horseshoe guide member 34 lest the upper surface of the arm 12 should hit the edge end 37a when the arm 12 is turned to the parallel position in the next step of operation.

To make the gripping action easier, at the station 5 the basket 50 may be raised a little to meet the descending fingers of the arm 12.

Generally alongside the first rail 51 there is provided a second rail 52 for holding down the actuating bar 27 of the gripper 14 relative to the arm 12. The second rail 52 has its starting end (or right-hand end in FIG. 18) 52a at such a height as to be engageable with the upper surface of the actuating bar 27 as it is held up as shown in FIG. 6 or 13. From the starting end 52a the rail 52 slopes down in the direction X of movement of the chain 1, lowering the actuating bar 27 relative to the arm 12 which has also been lowered by the rail 51 thereby to move the movable fingers 22 toward the fixed fingers 20, 21 to grip an egg therebetween at the station 5.

To put it in detail, as the actuating bar 27 is pushed down by the rail 52, the bar 27 is rotated about the pin 30 clockwise from the position shown in FIG. 7 or 13 relative to the arm 12 thereby to push the connecting rod 25 leftward. Actually at this time the arm 12 is at a lower position or is rotated farther counterclockwise than the position shown in FIG. 13. As previously mentioned, since the connecting rod 25 is loosely inserted transversely through the cross member 26, the above-mentioned leftward movement of the connecting rod 25 is transmitted resiliently to cause the member 23 consequently the movable fingers 22 to pivot clockwise about the pin 24 as far as the fingers 20, 21 and 22 grip an egg.

As mentioned above, since the movable member 23 and consequently the movable fingers 22 are urged by the spring 29, the distance between the fixed fingers and the movable fingers is automatically adjusted according to the size of the egg they grip thereby to avoid the danger of the egg being crushed.

When the holder 10 has grasped an egg at the station 5, the upper surfaces of the lowered arm 12 and the actuating bar 27 are held downwardly out of the recess 35 formed in the curved lateral wall 36 of the horseshoe guide member 34 or a little below the lower edge 37 of the guide member 34. Therefore, the arm 12 can be turned to the parallel position so that the gripper 14 faces forwardly in the direcion X of movement of the chain 1.

Figure 14:
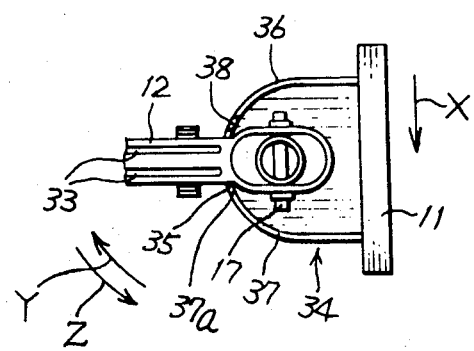
FIG. 14 is a bottom view of a portion of FIG. 13.

As the arm 12 is thus turned in the direction designated at Z in FIGS. 9, 10 and 14, the upper surfaces of the arm 12 and the actuating bar 27 come to engage the lower edge 37 of the horseshoe member 34, whereupon the function of the first and second rails 51 and 52 to hold down the arm 12 and the actuating bar 27 is no longer required. Therefore, the rails 50 and 51 need not extend any farther.

The above-mentioned turning of the gripper arm 12 to the parallel position is effected by engagement of the driving arm 16 with suitable rails 53 and 54 so provided as to extend along and above the path of the holder in the direction X. FIG. 19 is a schematic top plan view of the left-hand portion of FIG. 18. As the chain 1 runs in the direction X, the rear finger 16b of the driving arm 16 of the holder 10 that has gripped an egg comes into engagement with the rail 53, and as the holder advances in the direction X the rail 53 causes the driving arm 16 to rotate about the shaft 13 clockwise in FIG. 19. Upon farther advancement of the holder in the direction X, the forward end 16a of the driving arm 16 comes to engage the other rail 54, which causes the arm 16 to rotate farther clockwise to the parallel position, which is the position of the arm 16 of the left-hand holder shown in FIG. 18.

As previously mentioned, the holder with the arms 16 and 12 kept at the parallel position is conveyed to the egg-discharging station 7 where the arms are swung back to the perpendicular position to release the egg in the manner previously mentioned.

The embodiment of the invention illustrated in the drawings and described above in detail relates to a method and apparatus for handling eggs. It should be noted that the invention is not limited thereto but can be applied to any other objects liable to be deformed, broken or damaged like eggs, and that the invention is not limited to the illustrated embodiment but there are many changes and modifications.

What I claim is:

1. An apparatus for discharging objects as they are transported so as to be placed at a predetermined station, comprising: a plurality of holders each having means for releasably holding one of said objects; means for supporting said holders in a spaced apart relation to each other; means for moving said supporting means with said holders along a predetermined path at a first celocity; and means for causing said holding means of each of said holders to be moved relative to said supporting means while said supporting means is beng moved along said predetermined path at a first velocity so that said object held by said holding means of each of said holders is accelerated from said first velocity to a second velocity; and means for causing said holding means of each of said holders to release said object when said second velocity is achieved such that said object gently gravitates substantially vertically at said predetermined station; said means for releasably holding an object comprising a means for mounting said holding means to a transporting means of said supporting means movable at a first velocity in a predetermined direction; a shaft rotatably mounted on said mounting means; and an arm connected to said shaft and having a first end provided with means for releasably gripping an object, an arm axis crossing an axis of rotation of said shaft, so that rotation of said shaft causes said arm to be turned about said axis of said rotatable shaft between a first position in which said gripping means is of said axis of said rotatable shaft in the direction of said first velocity and a second position in which said arm lies substantially perpendicular to the direction of said first velocity.

2. An apparatus as in claim 1, wherein said means for releasably gripping said object comprises: a plurality of fixed fingers provided at said first end of said arm, a plurality of movable fingers so provided as to be movable relative to said fixed fingers and normally held away from said fixed fingers, and means for causing said movable fingers to be moved toward said fixed fingers to grip an object between said fixed and movable fingers.

3. An apparatus as in claim 1, wherein said arm is pivotally connected to said rotatable shaft by a pivot pin having a pin axis which is perpendicular to the axis of rotation of aid rotatable shaft, so that said arm is pivotal on said pibot pin between a first position in which said gripping means is kept open and held at a raised position and a second position in which said gripping means is kept closed and held at a lowered position.

4. An apparatus as in claim 1, wherein said transporting means comprises: an endless conveyor circulating at a predetermined velocity.

5. An apparatus as in claim 1, and further comprising: a second arm fixed to said rotatable shaft and so arranged as to be externally operated to cause rotation of said rotatable shaft.

6. An apparatus as in claim 2, wherein said means for causing movement of said movable fingers comprises: an actuating bar pivotally mounted on said arm and operatively connected to said movable fingers such that, as said bar is externally operated, said bar is pivoted relative to said arm to move said movable fingers toward said fixed fingers.

7. A method of discharging an object from a machine having means for transporting said object to a discharge station fixed relative to said machine, said transporting means moving at a first velocity, and comprising the steps of:
accelerating said object relative to said transporting means and to said discharge station such that a velocity of said object changes from said first velocity to a second velocity of substantially zero relative to said discharge station; and
discharging said object at said discharge station when said second velocity is achieved such that said object gently gravitates substantially vertically at said discharge station.

8. A method as in claim 7, wherein said accelerating comprises:
changing a direction of said object velocity through an angle of substantially 90°.

9. A method as in claim 8, wherein said accelerating comprises:
changing a direction of said object velocity from substantially parallel to a direction of said first velocity to substantially perpendicular to a direction of said first velocity.

10. A method as in claim 7, wherein said object is fragile, and further comprising the step of:
preventing damage to said fragile object during said discharging.

11. A method as in claim 8, and further comprising the steps of:
holding said object at one end of an arm pivotally attached to said transporting means at another end of said arm such that said object is transported at said first velocity with said arm in a first orientation relative to said transporting means direction of movement;
pivoting said arm generally in a plane from said first orientation to a second orientation substantially perpendicular to said first orientation as said arm approaches said discharge station; and
releasing said object from said one end.

12. A method as in claim 11, wherein said plane is substantially horizontal.

13. A method as in claim 11, wherein said plane is substantially vertical.

14. A method of transporting objects from a first station to a fixed second station and discharging said objects at said second station, each of said objects being transported by a respective holder moving at a first velocity between said stations, and comprising the steps of:
accelerating each of said objects from said first velocity to a second velocity of substantially zero relative to said second station during approach of each object to said second station; and
discharging each of said objects at said second station when said second velocity is achieved such that said objects are successively placed gently at said second station.

15. A method as in claim 14, wherein each holder is pivotally mounted upon an endless conveyor moving along a path between said stations, and further comprising the step of:
pivoting said holder relative to said path and generally in a plane to effect said accelerating.

16. A method as in claim 15, wherein said plane is substantially horizontal.

17. A method as in claim 15, wherein said plane is substantially vertical.

* * * * *